(12) United States Patent
Zalesak et al.

(10) Patent No.: US 7,228,717 B2
(45) Date of Patent: Jun. 12, 2007

(54) APPARATUS FOR GLASS SHEET FORMING WITH CROSS CURVATURE

(75) Inventors: Thomas J. Zalesak, Rossford, OH (US); Alfredo Serrano, Maumee, OH (US)

(73) Assignee: Glasstech, Inc., Perrysburg, OH (US)

( * ) Notice: Subject to any disclaimer, the term of this patent is extended or adjusted under 35 U.S.C. 154(b) by 98 days.

(21) Appl. No.: 10/865,525

(22) Filed: Jun. 10, 2004

(65) Prior Publication Data

US 2005/0274148 A1  Dec. 15, 2005

(51) Int. Cl.
*C03B 23/033* (2006.01)
*C03B 23/035* (2006.01)

(52) U.S. Cl. .................. 65/275; 65/291; 65/370.1
(58) Field of Classification Search ............... 65/106, 65/107, 273, 275, 287–291, 114, 118, 119, 65/370.1, 268
See application file for complete search history.

(56) References Cited

U.S. PATENT DOCUMENTS

| | | | |
|---|---|---|---|
| 4,540,426 A | * | 9/1985 | Bocelli et al. ............... 65/273 |
| 4,883,527 A | | 11/1989 | McMaster et al. |
| 4,966,618 A | * | 10/1990 | Letemps et al. ............... 65/106 |
| 5,009,693 A | | 4/1991 | Freidel et al. |
| 5,443,609 A | * | 8/1995 | Lehto .......................... 65/268 |
| 5,498,275 A | | 3/1996 | Reunamaki |
| 5,556,444 A | | 9/1996 | Reunamaki |
| 5,697,999 A | | 12/1997 | Reunamaki |
| 5,928,398 A | * | 7/1999 | Lehto .......................... 65/104 |
| 5,970,745 A | * | 10/1999 | Lehto ......................... 65/17.1 |
| 6,378,339 B1 | | 4/2002 | Zalesak et al. |
| 6,513,348 B2 | * | 2/2003 | Shetterly et al. ............... 65/104 |
| 6,722,160 B1 | * | 4/2004 | Nemugaki et al. ............ 65/114 |
| 6,783,358 B1 | * | 8/2004 | Lewandowski et al. ..... 432/144 |
| 2002/0189291 A1 | * | 12/2002 | Bennett et al. ............... 65/106 |

* cited by examiner

*Primary Examiner*—Carlos Lopez
(74) *Attorney, Agent, or Firm*—Brooks Kushman P.C.

(57) ABSTRACT

A glass sheet forming system (20) provides continuous roll conveyed forming of heated flat glass sheets to formed shapes having a major axis of curvature and a minor axis of curvature perpendicular to each other. The forming is performed by a roll station (30) having a shape retaining quench (36) associated with a lower deformable roll bed (32) and an upper deformable roll former (34). An adjustment mechanism (78) provides adjustment of the extent of the minor curvature and an actuating mechanism (56) is operable to provide the major curvature.

10 Claims, 9 Drawing Sheets

APPARATUS FOR GLASS SHEET FORMING WITH CROSS CURVATURE

BACKGROUND OF THE INVENTION

1. Field of the Invention

This invention relates to apparatus for forming glass sheets with major and minor curvatures that are generally perpendicular to each other.

2. Background Art

U.S. Pat. Nos. 5,498,275, 5,556,444, and 5,697,999 of Reunamaki and U.S. Pat. No. 6,378,339 Zelesak disclose a glass sheet forming system for forming heated glass sheets during conveyance along a direction of movement of the glass sheet through the system. The forming is provided by lower and upper sets of deformable rolls that are vertically aligned with each other along the direction of conveyance and supported by associated members that are movable to move the lower and upper sets of rolls between a flat condition for receiving a heated glass sheet from an associated furnace and a curved condition for forming the glass sheet to a curved shape along a direction transverse to the direction of conveyance. Other glass sheet forming that is performed during movement of the glass along a direction of conveyance is disclosed by U.S. Pat. No. 4,883,527 McMaster et al. and U.S. Pat. No. 5,009,693 Freidel et al.

The above prior art has primarily been utilized in the past to provide cylindrical curvature without any cross bending transverse to the major axis of bending. However, for some period of time, vehicle design requirements have glass sheet shapes that incorporate cross curvature with major and minor axes of curvature. Such cross curvature has been provided by press bending apparatus wherein a flat glass sheet is shaped between complementary press molds to provide both a major axis of curvature and cross bending about a minor axis of curvature. For example, vehicle side windows having a length of about 1,200 millimeters (about 39 inches) will have a major axis of forming about a longitudinal vehicle direction and will have cross bending about a vertically inclined axis. Such cross bending normally has a radius of curvature of about 30 meters and is thus relatively slight in comparison to the major curvature. More specifically, for a glass part having a length of 1,200 millimeters (about 46 inches), cross bending with a 30 meter radius of curvature provides a depth of curvature from a straight line between the opposite ends of the part to the glass of only about three to four millimeters. Nevertheless, such cross curvature provides compliance with design shapes as well as providing good optical appearance and structural requirements of the completed part.

SUMMARY OF THE INVENTION

An object of the present invention is to provide improved apparatus for forming glass sheets with major and minor curvatures about axes that are generally perpendicular to each other.

In carrying out the above object, the apparatus for forming glass sheets in accordance with the invention includes a forming station having a lower upwardly facing deformable roll bed and an upper downwardly facing deformable roll former between which heated flat glass sheets are cyclically conveyed along a direction of conveyance in preparation for forming. The lower deformable roll bed includes lower deformable rolls that are movable between straight shapes and curved shapes. The lower roll bed has upstream and downstream ends and an intermediate portion therebetween with the deformable rolls at the intermediate portion positioned lower than a straight line extending between the deformable rolls adjacent the upstream and downstream ends to provide a curved shape along a central conveying axis extending along the direction of conveyance. The upper deformable roll former has a downwardly facing shape that opposes and is complementary to the lower upwardly facing deformable roll bed and is deformable as the lower deformable rolls are deformed from their straight shapes to their curved shapes so as to have a continually complementary relationship with the lower deformable roll bed. An actuating mechanism of the apparatus provides relative vertical movement of the lower deformable roll bed and the upper deformable roll former toward each other after receiving each heated flat glass sheet therebetween, and the actuating mechanism actuates the lower deformable roll bed and the upper deformable roll former to provide deformation thereof to cyclically form the heated glass sheets with major and minor curvatures transverse to and along the conveying axis. A shape retaining quench of the apparatus cools the formed glass sheet to freeze its curved shape while between the lower deformable roll bed and the upper deformable roll former prior to delivery thereof from the forming station.

The lower deformable rolls of the intermediate portion of the lower deformable roll bed are located lower than the lower deformable rolls adjacent the upstream and downstream ends to provide the curved shape along the central conveying axis extending along the direction of conveyance.

Cooling provided by the shape retaining quench is sufficient to maintain the formed glass shape during subsequent delivery from the forming station but insufficient to impart permanent stresses thereto without further cooling in addition to natural convection. The apparatus also includes a quench for further cooling the formed glass sheet after delivery thereof from the forming station to provide permanent stresses that strengthen the formed glass sheet.

The upper deformable roll former is mounted for vertical movement and is moved vertically by the actuating mechanism of the apparatus to provide the relative vertical movement between the lower deformable roll bed and the upper deformable roll former.

The upper deformable roll former includes upper deformable rolls that are movable between straight shapes and curved shapes. Both the lower deformable roll bed and the upper deformable roll former of the forming station each include a plurality of elongated rails having opposite ends. The shape retaining quench has quench heads mounted on the rails of the lower deformable roll bed and the upper deformable roll former to supply pressurized gas that freezes the curved shape of the formed glass sheet prior to delivery from the forming station. An adjustment mechanism respectively supports the rails of the lower deformable roll bed and the rails of the upper deformable roll former while permitting vertical adjustment thereof to adjust the curvature of the deformable rolls along the direction of conveyance and to also adjust the positioning of the quench heads. A pair of lower linkages and a pair of upper linkages respectively support the opposite ends of the rails of the lower deformable roll bed and the rails of the upper deformable roll former to provide movement of the rails that moves the deformable rolls between the straight and curved shapes to provide the glass sheet forming.

Each elongated rail of the lower deformable roll bed and the upper deformable roll former includes an elongated support member that supports the associated quench heads and deformable rolls, and each rail includes a plurality of adjusters that support the elongated support member thereof on the associated rail. Each rail also includes an adjustment member that provides adjustment of all of the adjusters associated with the rail to thereby adjust the quench heads and deformable rolls supported by the rail. Each adjustment member includes a plurality of cam surfaces and each adjuster has a cam follower engaged and positioned by one of the cam surfaces of the associated adjustment member to provide its adjustment. This adjustment is preferably provided by a power operated actuator that provides positioning of the adjustment member of the rail to provide the adjustment of the adjusters of the rail.

In the preferred construction of the apparatus, each elongated rail includes a pair of elongated support members that cooperatively support the associated quench heads and deformable rolls, and each rail includes a plurality of adjusters that support the pair of elongated support members thereof on the rail. Each elongated rail also includes a pair of adjustment members that cooperatively provide adjustment of all of the adjusters associated with the rail. Each adjustment member includes a plurality of cam surfaces, and each adjuster has a pair of cam followers respectively engaged and positioned by a pair of the cam surfaces of the associated pair of adjustment members to provide its adjustment. Each rail also includes a power operated actuator that provides positioning of the pair of adjustment members of the associated rail to provide the adjustment of the adjusters of the rail.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
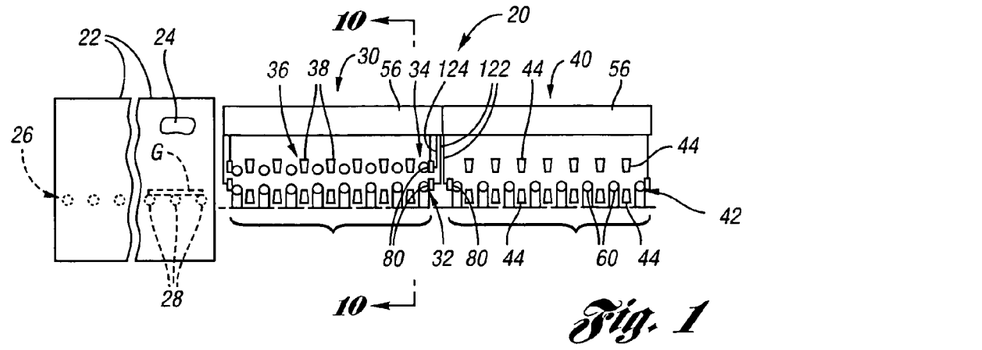
FIG. 1 is a side elevational view of a glass sheet forming system constructed in accordance with the present invention.

With reference to FIG. 1 of the drawings, a glass sheet forming system that embodies the present invention is generally indicated by 20 and is operable to provide forming of glass sheets with major and minor curvatures as is hereinafter more fully described. Forming system 20 includes a heating furnace 22 having a heating chamber 24 in which glass sheets G are heated during conveyance therethrough such as on a roll conveyor 26 having rolls 28 that are rotatively driven to provide the glass sheet conveyance during the heating. Forming system 20 also includes a forming station 30 that forms the heated glass sheets from a flat shape to a shape having major and minor axes of curvature that are transverse to each other as is hereinafter more fully described. This forming is performed between a lower deformable roll bed 32 and an upper deformable roll former 34 as is also hereinafter more fully described. Forming station 30 also includes a shape retaining quench 36 having quench heads 38 that supply pressurized gas to the formed glass sheet in order to freeze its shape for delivery from the forming station. Downstream from the forming station 30, the forming system 20 includes a quench 40 having a lower roll bed 42 that conveys the delivered glass sheet after forming in the forming station and this conveyance moves the formed glass sheet between lower and upper quench heads 44 for further cooling the glass sheet.

Figure 2:
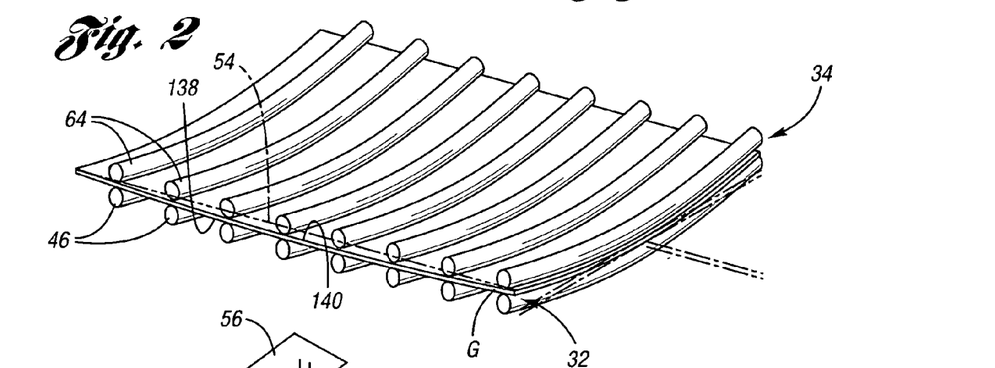
FIG. 2 is a schematic perspective view illustrating a lower deformable roll bed and an upper deformable roll former having rolls that are moved from straight shapes to the curved shapes illustrated to provide forming of glass sheets with major and minor curvatures whose axes extend transverse to each other.
Figure 4:
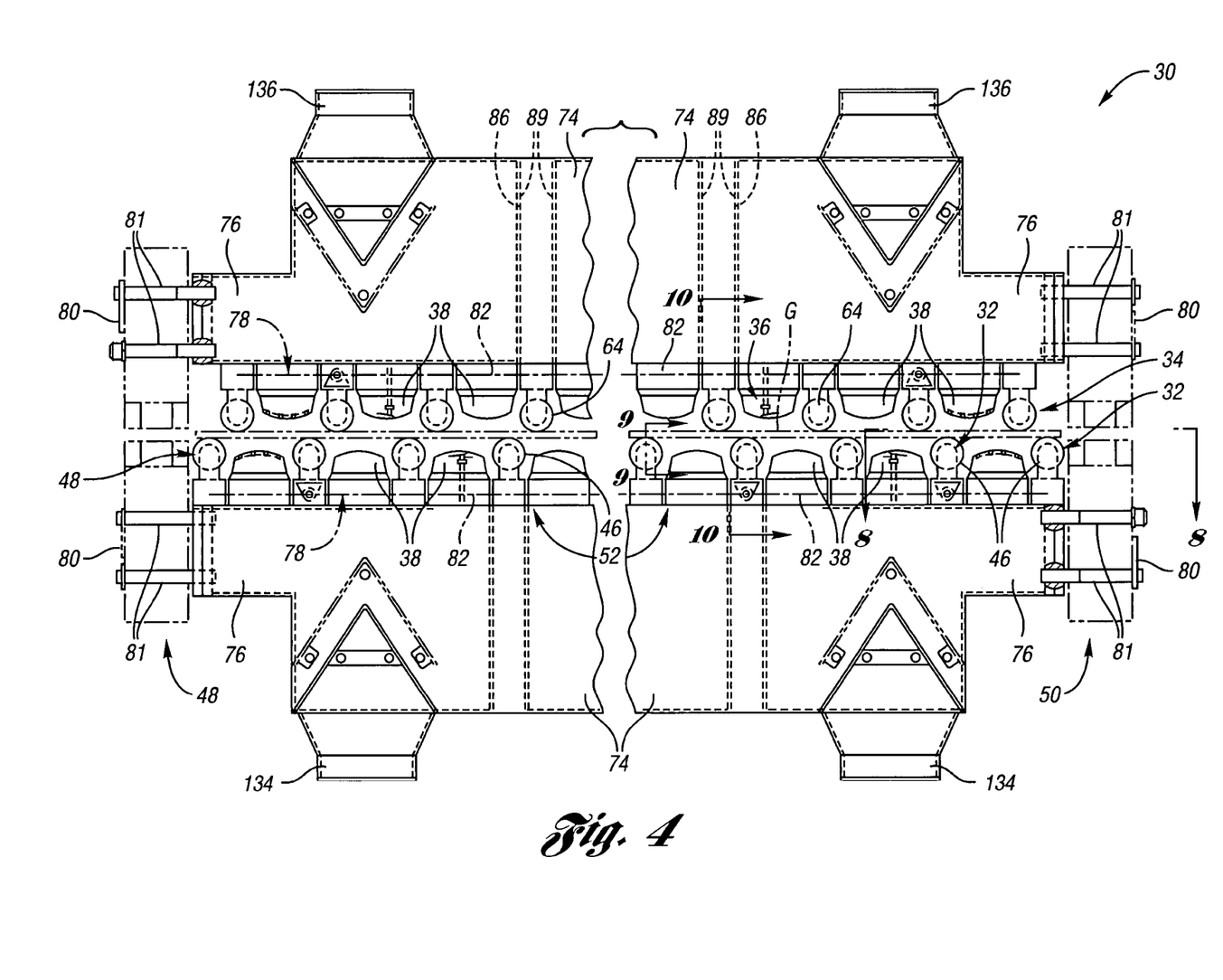
FIG. 4 is a side elevational view of a forming station of the forming system taken in the same direction as FIG. 1 but on an enlarged scale to further illustrate the construction of the forming station.
Figure 5:
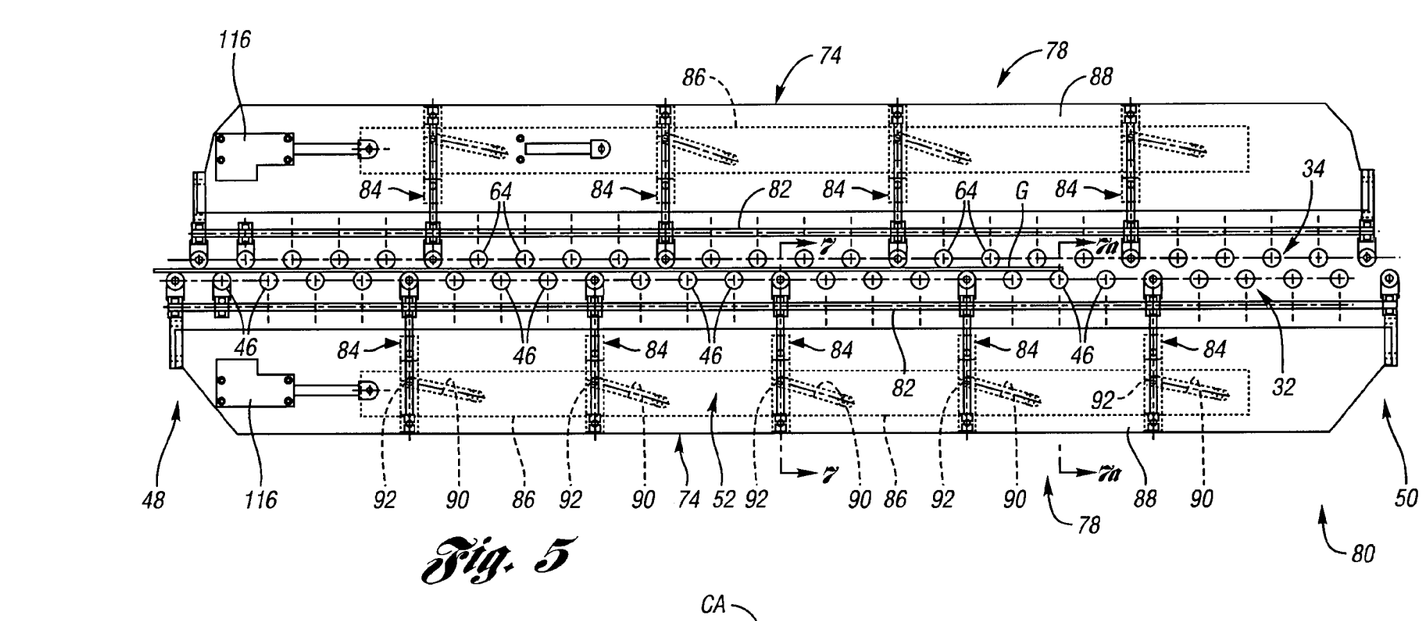
FIG. 5 is a side elevational view illustrating the manner in which the deformable rolls are adjustably mounted on the elongated rails of the forming system to provide the minor curvature of the formed glass sheet.
Figure 6:
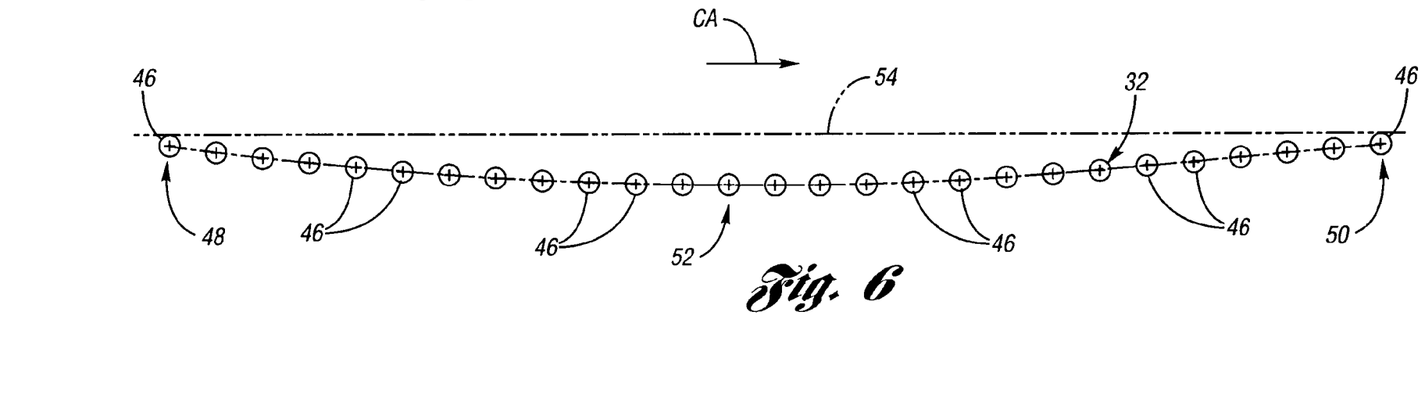
FIG. 6 is a schematic view taken in the same direction of FIG. 5 showing the rolls adjusted to provide the minor curvature which is shown to an exaggerated extent for purposes of illustration.
Figure 11:
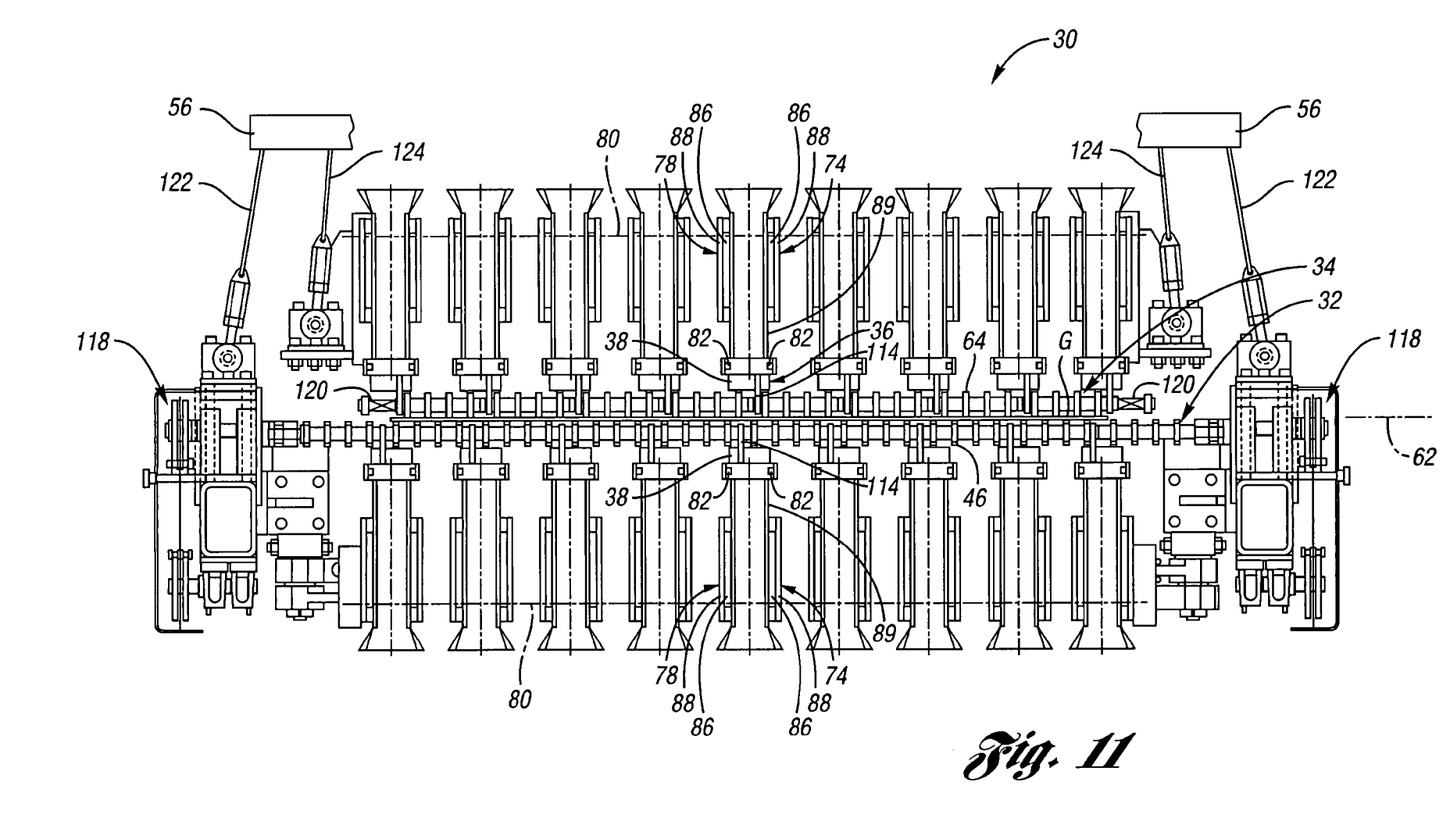
FIG. 11 is a view similar to FIG. 10 but showing the lower deformable roll bed and the upper deformable roll former moved toward each other to engage the heated glass sheet in preparation for the forming.
Figure 12:
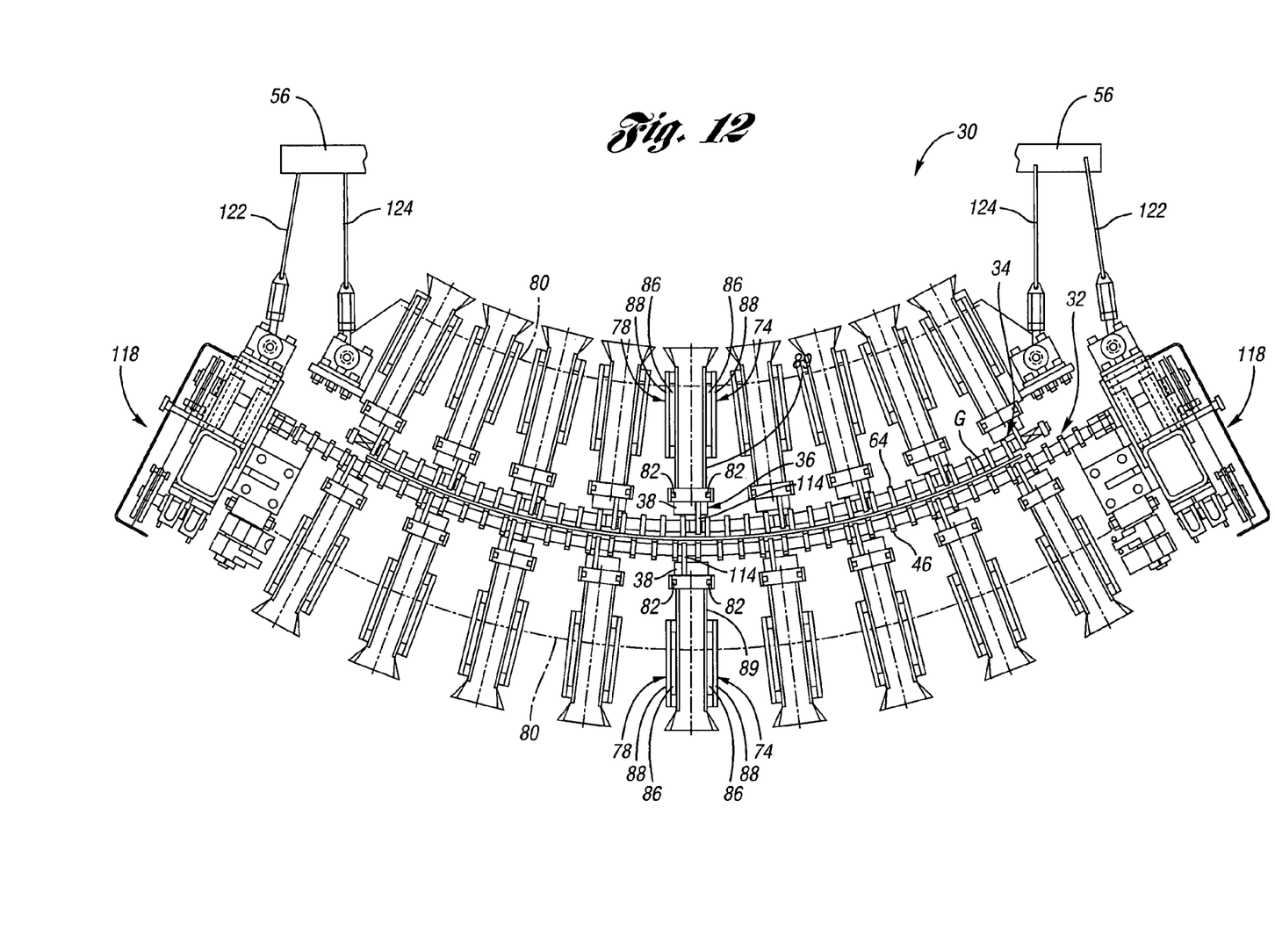
FIG. 12 is a view similar to FIG. 11 after the actuating mechanism has moved the lower deformable roll bed and the upper deformable roll former to provide the major curvature to the shape illustrated.

As schematically indicated in FIG. 2 and further indicated in FIGS. 4–6, the lower deformable roll bed 32 faces upwardly and includes lower deformable rolls 46 that are movable between straight shapes as illustrated in FIG. 11 and curved shapes as illustrated in FIG. 12. As illustrated in FIGS. 4–6, the lower deformable roll bed has upstream and downstream ends 48 and 50 and also has an intermediate portion 52 that extends between the upstream and downstream ends. As best illustrated in FIG. 6, the lower deformable rolls 46 of the intermediate portion 52 of the lower deformable roll bed 32 are positioned lower than a straight line 54 extending between the deformable rolls 46 adjacent the upstream and downstream ends 48 and 50 to provide a curved shape along a central conveying axis CA extending along the direction of conveyance of the glass sheet to be formed. The upper deformable roll former 34 has a downwardly facing shape that opposes and is complementary to the lower upwardly facing deformable roll bed 32, and the upper deformable roll former 34 is deformable as the lower deformable rolls 46 are deformed from their straight shapes shown in FIG. 11 to their curved shapes shown in FIG. 12 so as to have a continually complementary relationship with the lower roll bed.

Figure 10:
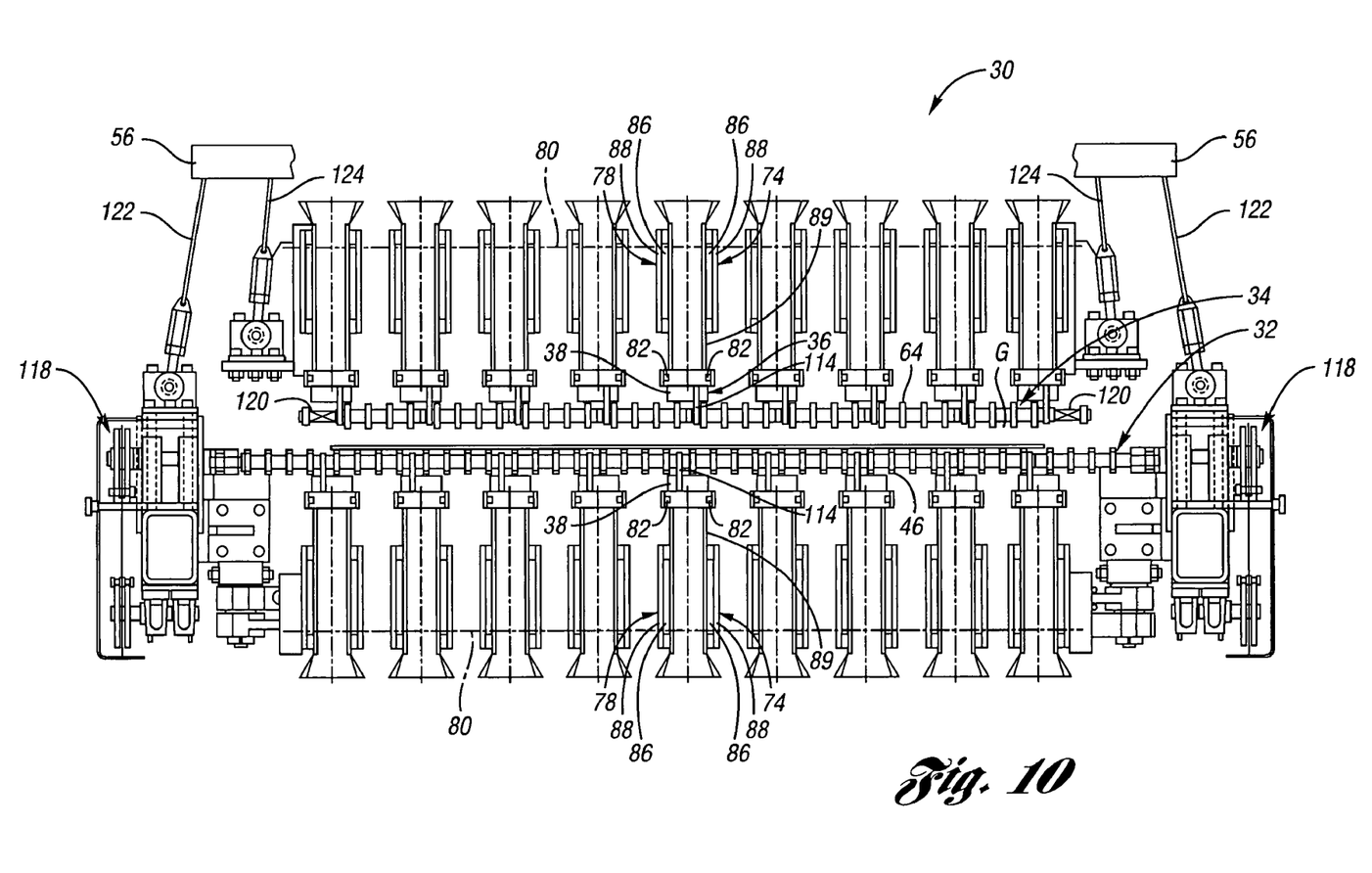
FIG. 10 is a sectional view taken along the direction of line 10—10 in FIG. 1 to illustrate the forming station with the lower deformable roll bed and the upper deformable roll former spaced from each other to receive a heated glass sheet therebetween in preparation for the forming.

An actuating mechanism 56 is schematically shown in FIGS. 10–12 and controls operation of the lower deformable roll bed 32 and the upper deformable roll former 34 as is hereinafter more fully described. This actuating mechanism is of the type disclosed by the aforementioned U.S. Pat. Nos. 5,498,275, 5,556,444, and 5,697,999 of Reunamaki, the entire disclosures of which are hereby incorporated by reference. More specifically, the lower deformable roll bed 32 and the upper deformable roll former 34 are initially positioned spaced from each other as shown in FIG. 10 to receive a heated glass sheet from the furnace in preparation for the forming. The upper roll former 34 will initially be spaced above the top glass surface a slight extent, normally less than one centimeter and more typically about 4–5 millimeters. The glass sheet is conveyed into the forming station 30 on its lower roll bed 32 and forms to the conveyor shape to provide the minor curvature to at least some extent, if not completely, under the force of gravity. This minor curvature is about an axis transverse to the conveying axis. Actuating mechanism 56 then provides relative movement between the lower deformable roll bed 32 and the upper deformable roll former 34 toward each other to the position of FIG. 11 so that the upper roll former is engaged with the heated glass sheet G being formed. The actuating mechanism 56 then actuates the lower deformable roll bed 32 and the upper deformable roll former 34 to provide deformation thereof to the curved shape shown in FIG. 12 to cyclically form the heated glass sheet with a major curvature extending transverse to the conveying axis in addition to the minor curvature formed along the conveying axis. Pressurized gas is then supplied through the quench heads 38 of the shape retaining quench 36 to freeze the curved shape of the formed glass sheet while it is still located between the lower deformable roll bed and the upper deformable roll former prior to delivery thereof from the forming station.

After the forming and initial quenching described above, the formed glass sheet is conveyed for delivery from the forming station 30 shown in FIG. 1 to the quench 40 onto the lower roll bed 42 whose rolls 60 are shaped with the major curvature of the formed glass sheet to convey and position the formed glass sheet between the quench heads 44 through which compressed quenching gas is supplied to further cool the glass sheet as is hereinafter more fully described.

As best illustrated in FIG. 6, the lower deformable rolls 46 of the intermediate portion 52 of the lower deformable roll bed 32 are located lower than the lower deformable rolls 46 adjacent the upstream and downstream ends 48 and 50 to provide the curved shape along the central conveying axis CA extending along the direction of conveyance. More specifically as shown in FIG. 5, the most upstream lower deformable roll 46 and the most downstream lower deformable roll 46 are fixedly mounted at the same elevation as each other and the other lower deformable rolls 46 are located lower than the straight line 54 therebetween as shown in FIG. 6. The quenching that is provided with the formed glass sheet between the lower deformable roll bed 32 and the upper deformable former 34 freezes the formed glass sheet with both its major and minor curvatures so that the formed glass sheet can be conveyed along the conveying axis C for delivery from the forming station without losing its shape.

It should be appreciated that, while the lower deformable roll bed has the preferred construction illustrated above as disclosed, it is also possible for the lower deformable rolls 46 adjacent the upstream end 48 to have a generally tangent relationship with the furnace conveyor 26 such that the rolls extend upwardly in a downstream direction along the intermediate portion 52 to the downstream end 50. Likewise, it is also possible for the lower deformable roll bed to extend downwardly from its upstream end 48 along its intermediate portion 52 to its downstream end 50 such that the downstream end of the lower deformable roll bed 32 is tangent with the quench roll bed 42. In either of these cases, the lower deformable rolls 46 of the intermediate portion 52 are still located below the straight line 54 between the lower deformable rolls at the upstream and downstream ends 48 and 50 as with the construction illustrated where the most upstream and most downstream lower deformable rolls 46 are at the same elevation as each other.

The cooling provided by the shape retaining quench 36 of the forming station 30 is sufficient to maintain the formed glass shape during subsequent delivery from the forming station but is insufficient to impart permanent stresses thereto without further cooling in addition to natural convection. Such more limited cooling of formed glass sheet shortens the time period that the glass sheet must remain within the forming station and thereby reduces the cycle time so as to provide a greater volume of output during any given time. After this initial cooling, the transfer of the formed glass sheet from the forming station to the quench station 40 provides further cooling of the formed glass sheet which provides permanent stresses that strengthen the formed glass sheet either by way of heat strengthening or tempering depending upon the degree of strengthening required.

As illustrated by FIGS. 10 and 11, the lower deformable roll bed 32 is maintained stationary after the heated flat glass sheet G is received thereby below the upper deformable roll former 34, and the actuating mechanism 56 moves the upper deformable roll former 34 downwardly from the position of FIG. 10 to the position of FIG. 12 to provide the relative vertical movement therebetween that ensures the forming of the minor curvature along the direction of conveyance prior to the forming that provides the major curvature. Thereafter, the actuating mechanism 56 moves both the lower deformable roll bed 32 and the upper deformable roll former 34 to the curved shapes of FIG. 12 to provide the major curvature of the formed glass sheet. The upper roll former 34 is then moved by the actuating mechanism 56 upwardly and the initial quenching takes place to freeze the shape of the formed glass sheet prior to delivery thereof by conveyance on the lower deformable roll bed 32 from the forming station to the quench station for the further cooling.

Figure 9:
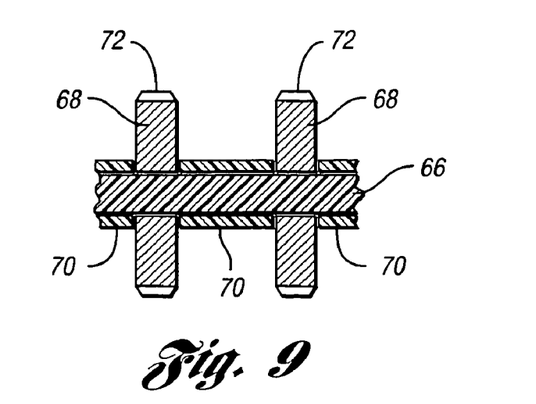
FIG. 9 is a longitudinal sectional view taken through one of the deformable rolls to illustrate its construction.

As illustrated in FIGS. 2, 4 and 10–12, the upper deformable roll former 32 includes upper deformable rolls 64 that are movable between a straight shape as shown in FIGS. 10 and 11 and the curved shape of FIG. 12. Both the lower deformable roll 32 and the upper deformable rolls 64 each have the construction shown in FIGS. 9–12. More specifically, as shown in FIG. 9, each deformable roll has a central shaft 66 that is inserted through roll wheels 68 and spacers 70. The outer circumference of the roll wheels 68 may have a high temperature cloth 72, such as of aromatic polyamide fibers, extending with a round shape that contacts the glass sheet. The lower deformable rolls have the shaft 66 provided with a square shape that extends through central square openings of the wheels 68 so as to be rotatively driven, while the upper deformable rolls 64 can have the shaft 66 provided with a round shape extend through round openings in the wheels since the upper rolls are not driven but are freewheeling. The outer diameter of the roll wheels is about 32 millimeters (1.25 inches) and the deformable rolls are positioned on centers spaced about 76 millimeters (3 inches) from each other. Also, the spacers 70 have different lengths from one roll to the next along the direction of conveyance so the glass sheet is rollingly engaged at different lateral positions throughout the conveyance to avoid forming strips on the glass.

Figure 3:
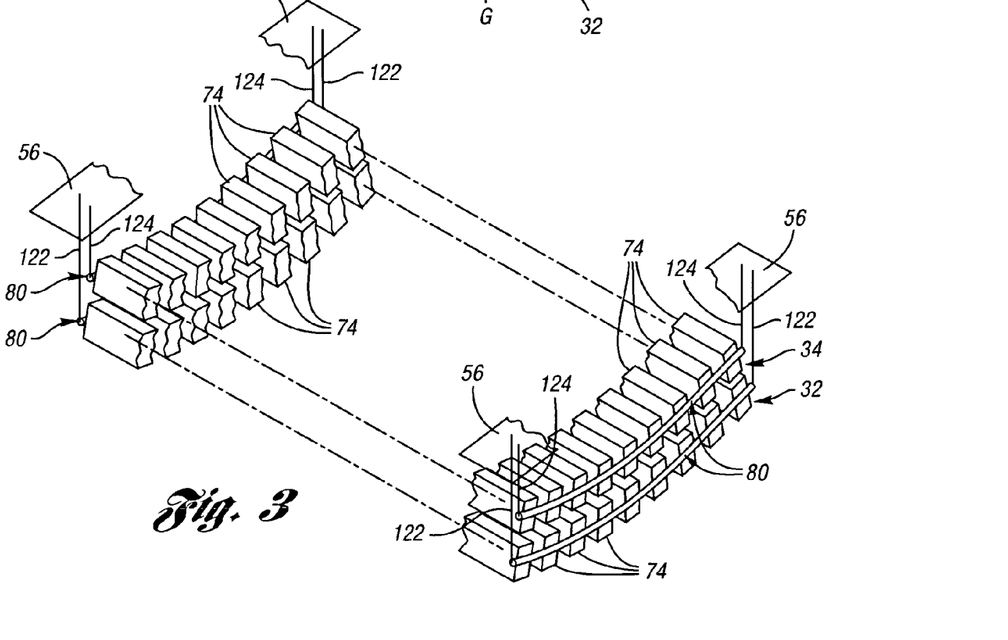
FIG. 3 is a perspective schematic view illustrating elongated rails of an actuating mechanism that supports the deformable rolls to provide movement thereof between their straight and curved shapes to provide the glass sheet forming.

As illustrated in FIGS. 3 and 5, the lower deformable roll bed and the upper deformable roll former of the forming station each include a plurality of elongated rails 74 having opposite ends 76 at upstream and downstream locations. These rails 74 as is hereinafter more fully described support the deformable rolls and the quench heads 38 through which the quench gas is supplied to initially freeze the curved shape of the formed glass sheet as previously described. An adjustment mechanism collectively and individually indicated generally by 78 in FIG. 5 respectively support the lower and upper deformable rolls 46 and 64 on each rail 74 of the lower deformable roll bed 32 and each rail 74 of the upper deformable roll former 32 while permitting vertical adjustment thereof to adjust the curvature along the direction of conveyance. As illustrated in FIG. 5, the rolls 46 and 64 are adjusted in a straight shape along the direction of conveyance such that the forming station is capable of providing cylindrical forming with just the major curvature if such production is required. However, the adjustment mechanisms 78 are adjusted to provide the curved shape of the lower deformable roll bed 32 as shown in FIG. 6 and at the same time will provide the upper deformable roll former 34 with a complementary curved shape as previously described to provide the forming with both major and minor curvatures.

As shown in FIG. 4, a pair of schematically indicated lower linkages 80 and a pair of schematically indicated upper linkages 80 respectively support the opposite ends 76 of the rails 74 of the lower deformable roll bed 32 and the rails 74 of the upper deformable roll former 34 to provide movement of the rails that moves the deformable rolls between the straight and curved shapes as previously described to provide the glass sheet forming along the major curvature. The linkages 80 are secured to the rails 74 by connectors 81, and the linkages 80 are preferably of the type disclosed by the aforementioned U.S. Pat. Nos. 5,498,275, 5,556,444 and 5,697,999 of Reunamaki, the entire disclosures of which have been incorporated herein by reference. Such linkages preferably provide a constant radius of curvature although it is possible to provide such major curvature with varying radii depending upon the design requirements of the glass sheet forming being performed.

The extent of the minor curvature does not have to be particularly great to satisfy most design requirements. More specifically, for a glass sheet vehicle part having a length of 1,200 millimeters, a radius of curvature of 30 meters will provide a depth of curvature from a straight line between the ends of the formed glass sheet to the glass at an intermediate portion between the ends of about three to four millimeters which is usually sufficient. A minimum curvature of 15 meters will provide a depth of curvature of about eight to nine millimeters on such a part, which is twice what is usually required for such a sized part.

Figure 7:
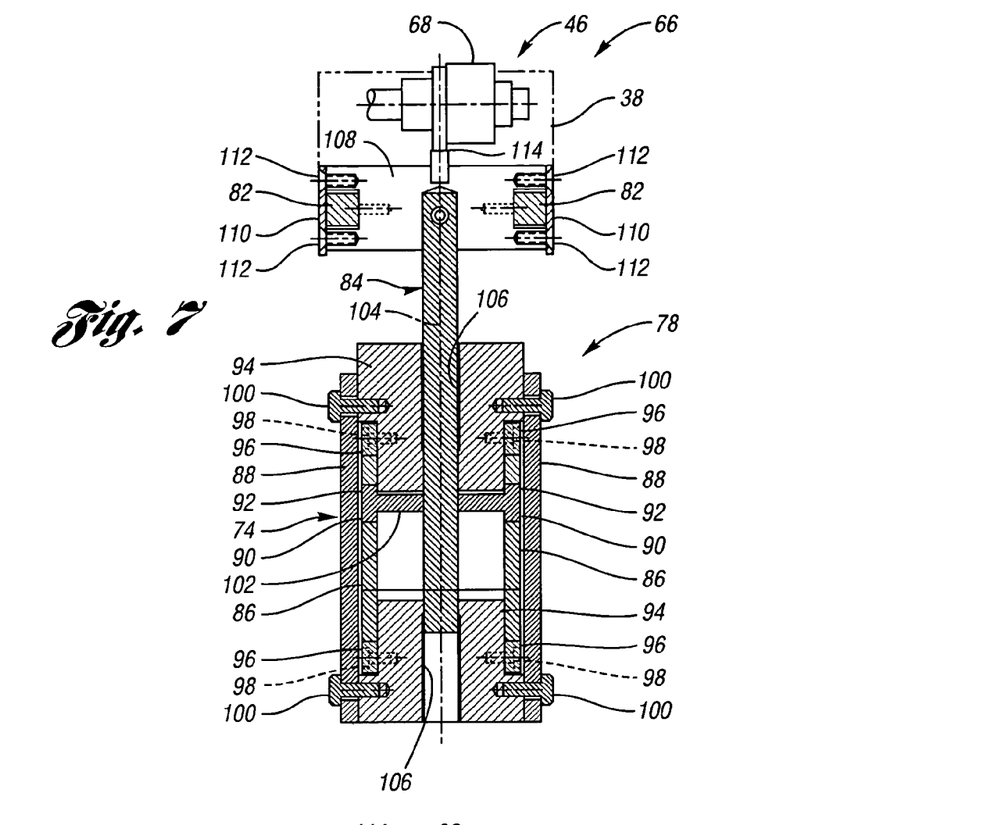
FIG. 7 is a sectional view taken along the direction of line 7—7 in FIG. 5 to further illustrate the manner in which the deformable rolls are supported on the rails by adjusters.
Figure 7A:
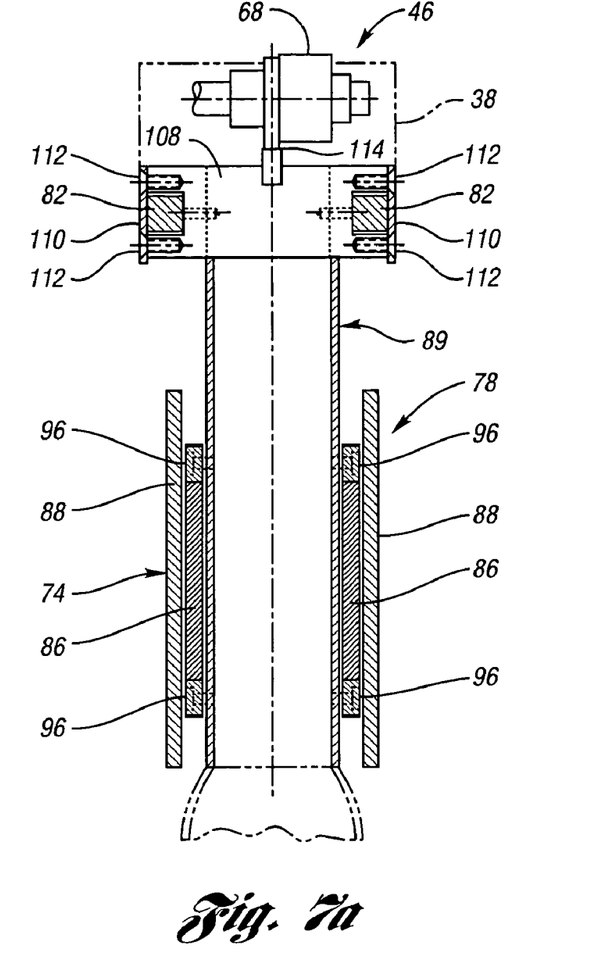
FIG. 7a is a sectional view taken along line 7a—7a of FIG. 5 to illustrate the manner in which the deformable rolls, quench heads and plenums are adjustably supported between the adjusters shown in FIG. 7.
Figure 8:
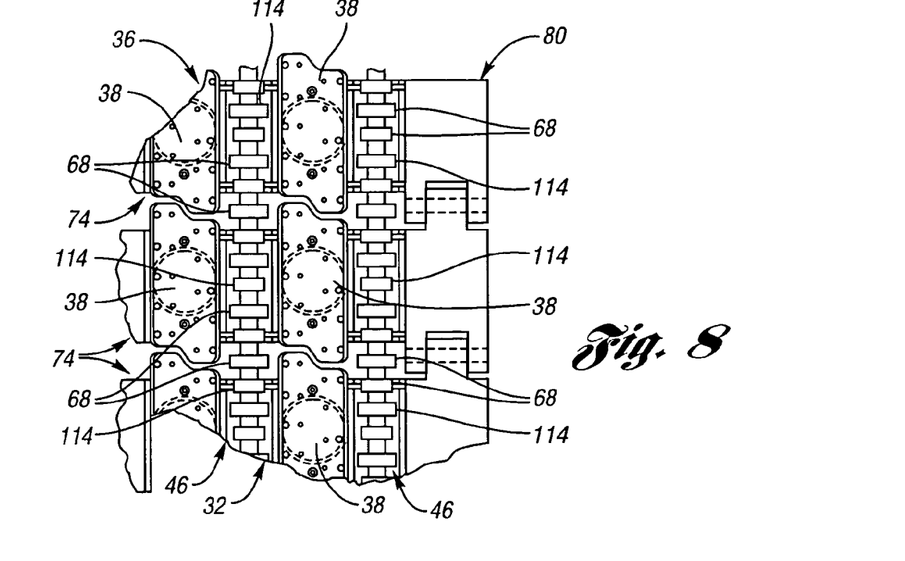
FIG. 8 is a top plan view taken along the direction of line 8—8 in FIG. 4 to illustrate quench heads and deformable rolls that are mounted on the rail to provide the initial cooling of the formed glass sheet so as to freeze its shape prior to delivery from the forming station.

As shown in FIG. 5, the adjustment mechanism 78 includes an elongated support member 82 that supports the associated deformable rolls. More specifically as shown in FIGS. 7 and 7a, there are actually a pair of such elongated support members 82 that are spaced laterally from each other along the direction of conveyance in a parallel relationship with each other. Each rail 74 as shown in FIGS. 5 and 7 includes a plurality of adjusters 84 that support the elongated support members 82 on the associated rail 74 between the upstream and downstream ends 48 and 50. Each rail also includes an adjustment member 86 that provides adjustment of all of the adjusters 84 associated with the rail to thereby adjust the deformable rolls supported by the rail to the desired curvature. Actually, as shown in FIG. 7, there are two of the adjustment members 86 in a laterally spaced parallel relationship to each other and to the elongated support members 82 previously described.

As illustrated in FIG. 5, certain of the deformable rolls 46 are mounted by the adjusters 84 which are connected to the elongated members 82 as also illustrated in FIG. 7. The endmost deformable rolls 46 are each mounted directly on a pair of laterally spaced vertical plates 88 of each elongated rail 74 (see also FIGS. 7 and 7a) and these endmost deformable rolls are connected to the opposite ends of the elongated support members 82. The other deformable rolls are supported as shown in FIG. 7a on the pair of elongated support members 82 between the adjusters at the intermediate portion 52 and between one adjuster and the adjacent endmost deformable roll at the opposite ends. The elongated members 82 also support the quench heads 38 between the deformable rolls 46 and 64 as shown in FIGS. 5, 7 and 7a. Furthermore, the elongated members 82 support plenums 89 which feed pressurized gas to the quench heads 38. These plenums 89 are mounted between the rail vertical plates 88 as shown in FIG. 7a and are located as shown in FIG. 4 between each most downstream deformable roll 46 and 64 and the adjacent adjuster 84 as well as between each pair of adjusters 84 along the length of the rails. The plenums 89 are thus moved with the deformable rolls 46 and 64 and with the quench heads 38 during the adjustment that provides the required minor curvature along the direction of conveyance.

Each adjustment member 86 as illustrated in FIG. 5 includes a plurality of cam surfaces 90 that are respectively associated with the adjusters 84. Each adjuster 84 as shown in FIG. 7 has a pair of cam followers 92 respectively received by the cam surfaces 90 such that longitudinal movement of the adjustment members 86 moves all of the adjusters at the same time. Each adjuster 84 includes an inner block 94 having upper and lower portions, and the adjustment members 86 are located on opposite sides of the inner block 94 as shown in FIG. 7. A pair of slides 96 associated with each rail plate 88 are secured by associated bolts 98 to the inner block 94 and are positioned above and below the adjacent adjustment members 86. Bolts 100 secure the rail plates 88 to the inner block 94 with the adjustment members 86 in a sandwich relationship therebetween while being permitted to slide longitudinally between the slides 96. A cross pin 102 extends between the cam followers 92 of each adjuster 84 and through a vertical adjuster rod 104 that extends through a vertical hole 106 in the inner block 94. The upper end of the rod 104 is secured to a connector 108 that extends between the pair of elongated support members 82 and has outer end plates 110 secured by bolts 112 such that the elongated support members 82 can slide longitudinally as necessary during the adjustment. The associated deformable roll 46 is mounted by a top connector portion 114 to rotatably support the associated shaft. As shown in FIG. 7a, the other deformable rolls not associated with the adjusters have a similar connector 108 extending between the elongated support members 82 to provide the rotational support of these other rolls as well as supporting the quench heads 38 and the plenums 89.

Longitudinal adjustment of the pair of elongated members 86 shown in FIG. 7 provides movement thereof with respect to the rail plates 88 such that the cam surfaces move the associated adjuster rod 104 vertically to thereby adjust the vertical position of the associated deformable roll and all of the other adjacent rolls in cooperation with the other adjusters. The angles of the cam surfaces 90 are selected so that the longitudinal curvature that provides the minor curvature of the formed glass sheet is as desired, specifically with the constant radius of curvature previously described in the preferred construction.

As illustrated in FIG. 5, a power operated actuator 116 moves the pair of adjustment members 86 of each rail 74 to provide their longitudinal adjusting movement that adjusts the deformable rolls. This power operated actuator is preferably an electric servomotor that drives a ball screw connected to both adjustment members 86 so as to provide accurate adjustment. Each power operated actuator 116 may be located between the most upstream deformable roll 46 or 64 and the adjacent adjuster 84, and at a location between the vertical plates 88 of the associated rail 74. At this upstream location the need for quenching is the least and, it is believed that the quenching may not be required at all there because the glass will already have passed downstream therefrom during the cycle before quenching begins.

It should be appreciated that the adjustment mechanism 78 illustrated in FIG. 7 with the associated lower deformable roll 46 is also illustrative of the construction on the adjustment mechanism of the upper rails except for being rotated 180° from each other, thus the upper unit is in an upside down relationship from that illustrated with the lower unit shown in FIG. 7.

With reference to FIG. 10, the lower deformable rolls 46 of the lower deformable roll bed 32 are rotatively driven at their opposite ends by drive mechanisms 118 which are of the type disclosed by U.S. Pat. No. 3,678,339 Zelesak et al., the entire disclosure of which is hereby incorporated by reference. Furthermore, the upper deformable roll 64 as previously mentioned are freewheeling and their opposite ends are compressed by springs 120 extending around the ends of the associated roll shafts. Each hollow rail 74 is supported by the associated linkages 80 (FIG. 4) for movement of the deformable rolls between the straight shapes of FIGS. 10 and 11 and the curved shapes of FIG. 12 as previously described. Flexible chains 122 extend from the actuating mechanism 56 to the drive mechanism 118 and to the associated linkages 80 to support the lower deformable rolls 46, while flexible chains 124 extend between the actuating mechanism and the associated linkages 80 adjacent the most lateral outward hollow rails 74 to support the upper deformable rolls 64. The lower and upper deformable rolls 46 and 64 are thus supported by chains 122 and 124 for movement between their straight shapes as illustrated in FIGS. 10 and 11 and their curved shapes as illustrated in FIG. 12.

Also, the lower deformable rolls 46 and upper deformable rolls 64 can be horizontally offset from each other along the direction of conveyance as disclosed by the aforementioned U.S. Pat. No. 6,378,339 of Zalesak et al. which has been incorporated by reference. This horizontal offset of the lower and upper rolls helps in maintaining straightness of the cylindrically formed glass sheet along the direction of conveyance.

Figure 13:
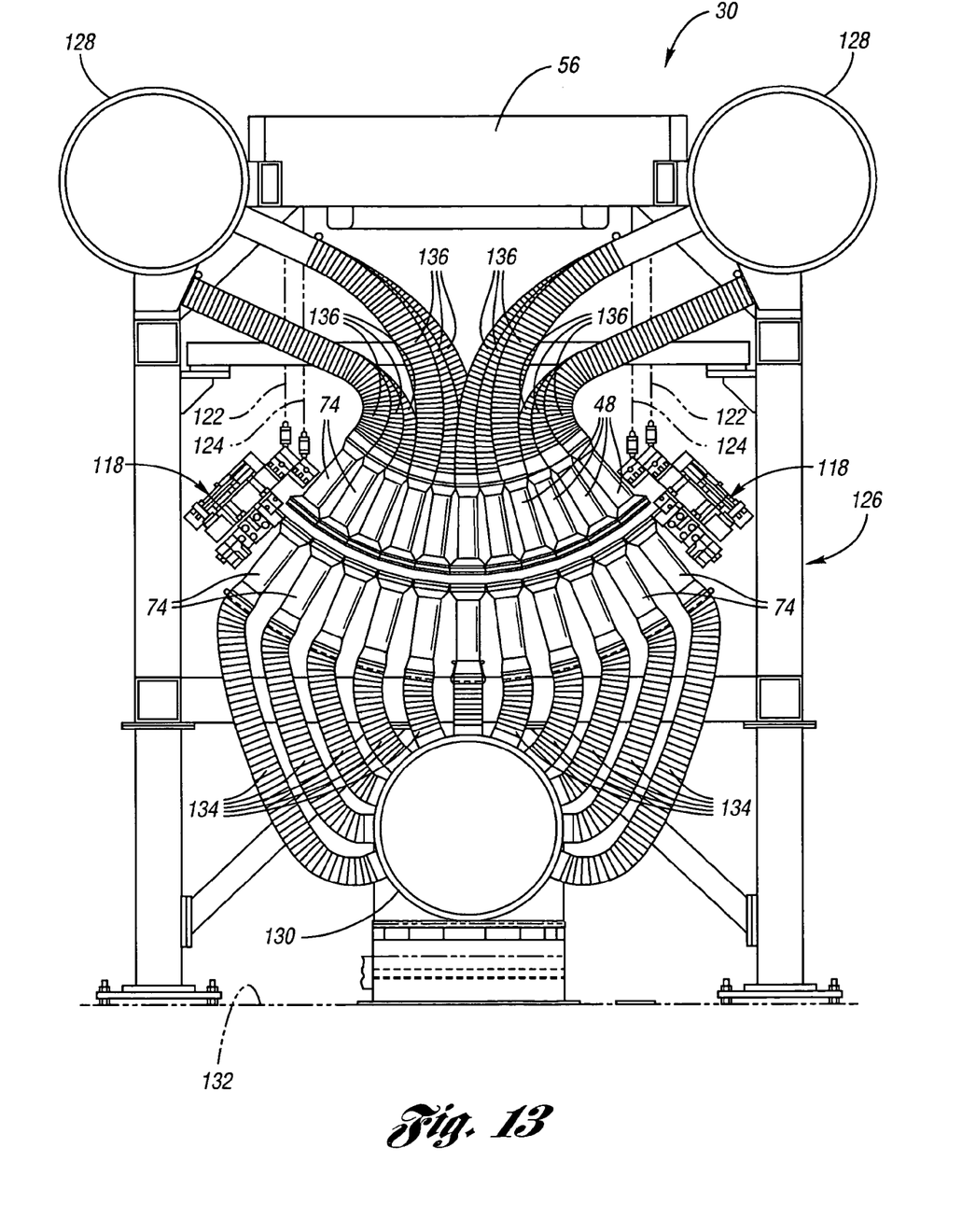
FIG. 13 is a view taken in the same direction as FIGS. 10–12 but illustrating the duct and hose system that supplies pressurized gas to the lower deformable roll bed and the upper deformable roll former to freeze the formed glass sheet to its curved shape in preparation for delivery from the forming station.

As illustrated in FIG. 13 where the lower deformable roll bed and the upper deformable roll former have their deformable rolls removed for purposes of clarity, a framework 126 supports a pair of upper quench tubes 128 that have elongated round shapes similar to a lower quench tube 130 that is mounted on the factory floor 132. The framework 126 is also supported on the factory floor 132 and at its upper extremity supports the actuating mechanism 56. Flexible quench conduits 134 extend between the lower quench duct 130 and the lower elongated rails 74 of the lower deformable roll bed 32 to supply quenching gas to their quench heads as previously described. Likewise, flexible quench conduits 136 extend between the upper quench ducts 128 and the elongated rails 74 of the upper deformable roll former to supply quenching gas to their quench heads.

The bending system of the invention provides a faster cycle time and reduced job change shut down time as compared to press bending systems.

The formed glass sheet produced by the apparatus and method of the invention has the shape illustrated in FIG. 2 as identified by reference numeral G. More specifically, this formed glass sheet G has oppositely facing curved glass surfaces 138 and 140 of convex and concave shapes. Each of these glass surfaces 138 and 140 has a major central axis with a curvature of a constant radius and also has a minor central axis with a curvature of a constant radius extending perpendicular to the major central axis. In addition, the cooling provided initially by the shape retaining quench 36 and subsequently by the quench 40 provides permanent stresses that strengthen the formed glass sheet.

While the preferred embodiment has been described in detail, those familiar with the art to which the invention relates will recognize various alternative ways for practicing the invention as defined by the following claims.

What is claimed is:

1. Apparatus for forming glass sheets comprising:
a forming station including a lower upwardly facing deformable roll bed and an upper downwardly facing deformable roll former between which heated flat glass sheets are cyclically conveyed along a direction of conveyance in preparation for forming, the lower deformable roll bed including lower deformable rolls that are movable between straight shapes and curved shapes, the lower roll bed having upstream and downstream ends and an intermediate portion extending therebetween with the deformable rolls at the intermediate portion positioned lower than a straight line extending between the deformable rolls adjacent the upstream and downstream ends to provide a curved shape along a central conveying axis extending along the direction of conveyance, the upper deformable roll former including upper deformable rolls that are movable between straight shapes and curved shapes, the upper deformable roll former having a downwardly facing shape that opposes and is complementary to the lower upwardly facing deformable roll bed, and the upper deformable roll former being deformable as the lower deformable rolls are deformed from their straight shapes to their curved shapes so as to have a continually complementary relationship therewith;

an actuating mechanism that provides relative vertical movement of the lower deformable roll bed and the upper deformable roll former toward each other after receiving each heated flat glass sheet therebetween and that actuates the lower deformable roll bed and the upper deformable roll former to provide deformation thereof to cyclically form the heated glass sheets with major and minor curvatures transverse to and along the conveying axis;

the lower deformable roll bed and the upper deformable roll former of the forming station each including a plurality of elongated rails having opposite ends, the actuating mechanism respectively supporting the rails of the lower deformable roll bed and the rails of the upper deformable roll former while permitting vertical adjustment thereof to adjust the curvature of the deformable rolls along the direction of conveyance, and a pair of lower linkages and a pair of upper linkages that respectively support the opposite ends of the rails of the lower deformable roll bed and the rails of the upper deformable roll former to provide movement of the rails that moves the deformable rolls between the straight and curved shapes to provide the glass sheet forming; and a shape retaining quench for cooling the formed glass sheet to freeze its curved shape while between the lower deformable roll bed and the upper deformable roll former prior to delivery thereof from the forming station, and the shape retaining quench having quench heads mounted on the rails of the lower deformable roll bed and the upper deformable roll former to supply the pressurized gas that freezes the curved shape of the formed glass sheet.

2. Apparatus for forming glass sheets as in claim 1 wherein the most upstream and most downstream lower deformable rolls of the lower deformable roll bed are located at the same elevation as each other and wherein the lower deformable rolls of the intermediate portion of the lower deformable roll bed are located lower than the lower deformable rolls adjacent the upstream and downstream ends to provide the curved shape along the central conveying axis extending along the direction of conveyance.

3. Apparatus for forming glass sheets as in claim 1 where the cooling provided by the shape retaining quench is sufficient to maintain the formed glass shape during subsequent delivery from the forming station but insufficient to impart permanent stresses thereto without further cooling in addition to natural convection.

4. Apparatus for forming glass sheets as in claim 1 further including a quench for further cooling the formed glass sheet after delivery thereof from the forming station to provide permanent stresses that strengthen the formed glass sheet.

5. Apparatus for forming glass sheets as in claim 1 wherein the upper deformable roll former is mounted for vertical movement and is moved vertically by the actuating mechanism to provide the relative vertical movement between the lower deformable roll bed and the upper deformable roll former.

6. Apparatus for forming glass sheets as in claim 1 wherein each elongated rail includes an elongated support member that supports the associated quench heads and deformable rolls, each rail including a plurality of adjusters that support the elongated support member thereof on the rail, and each rail including an adjustment member that provides adjustment of all of the adjusters associated with the rail to thereby adjust the quench heads and the deformable rolls supported by the rail.

7. Apparatus for forming glass sheets as in claim 6 wherein each adjustment member includes a plurality of cam surfaces and each adjuster having a cam follower engaged and positioned by one of the cam surfaces of the associated adjustment member to provide its adjustment.

8. Apparatus for forming glass sheets as in claim 7 wherein each elongated rail includes a power operated actuator that provides positioning of the adjustment member of the rail to provide the adjustment of the adjusters of the rail.

9. Apparatus for forming glass sheets as in claim 1 wherein each elongated rail includes a pair of elongated support members that cooperatively support the deformable rolls, quench heads also supported by the elongated support members of the elongated rails, each rail including a plurality of adjusters that support the pair of elongated support members thereof on the rail, each elongated rail including a pair of adjustment members that cooperatively provide adjustment of all of the adjusters associated with the rail, each adjustment member including a plurality of cam surfaces, each adjuster having a pair of cam followers respectively engaged and positioned by a pair of the cam surfaces of the associated pair of adjustment members to provide its adjustment, and each rail including a power operated actuator that provides positioning of the pair of adjustment members of the associated rail to provide the adjustment of the adjusters of the rail.

10. Apparatus for forming glass sheets comprising:

a furnace including a heating chamber having a conveyor for conveying flat glass sheets along a direction of conveyance for heating to a forming temperature;

a forming station located adjacent the furnace including a lower upwardly facing deformable roll bed and an upper downwardly facing deformable roll former between which the heated flat glass sheets are cyclically received from the furnace for forming, the lower deformable roll bed including lower deformable rolls that are movable between straight shapes and curved shapes, the lower roll bed having upstream and downstream ends and an intermediate portion extending therebetween with the deformable rolls at the intermediate portion positioned lower than deformable rolls adjacent the upstream and downstream ends to provide a curved shape along a central conveying axis extending along the direction of conveyance, the upper deformable roll former including upper deformable rolls that are movable between straight shapes and curved shapes, the upper deformable roll former having a downwardly facing shape that opposes and is complementary to the upwardly facing lower deformable roll bed, and the upper deformable roll former being deformable as the lower deformable rolls are deformed from their straight shapes to their curved shapes so as to have a continually complementary relationship therewith;

an actuating mechanism that moves the upper roll former vertically in a downward direction toward the lower roll bed after receiving each heated flat glass sheet therebetween and that actuates the lower deformable roll bed and the upper deformable roll former to provide deformation thereof to cyclically form each heated glass sheet to a curved shape with major and minor curvatures transverse to and along the conveying axis;

the lower deformable roll bed and the upper deformable roll former of the forming station each including a plurality of elongated rails having opposite ends, the actuating mechanism respectively supporting the rails of the lower deformable roll bed and the rails of the upper deformable roll former while permitting vertical adjustment thereof to adjust the curvature of the deformable rolls along the direction of conveyance, and a pair of lower linkages and a pair of upper linkages that respectively support the opposite ends of the rails of the lower deformable roll bed and the rails of the upper deformable roll former to provide movement of the rails that moves the deformable rolls between the straight and curved shapes to provide the glass sheet forming;

a shape retaining quench for freezing the curved shape of the formed glass sheet while between the lower deformable roll bed and the upper deformable roll former prior to delivery thereof from the forming station with the cooling being sufficient to maintain the formed glass shape during subsequent delivery from the forming station but insufficient to impart permanent stresses thereto without further cooling in addition to natural convection, and the shape retaining quench having quench heads mounted on the rails of the lower deformable roll bed and the upper deformable roll former to supply the pressurized gas that freezes the curved shape of the formed glass sheet; and a quench for further cooling the formed glass sheet after delivery thereof from the forming station to provide permanent stresses that strengthen the formed glass sheet.

* * * * *